United States Patent
Batchelor et al.

(10) Patent No.: US 11,386,307 B2
(45) Date of Patent: Jul. 12, 2022

(54) MACHINE VISION SYSTEM (71) Applicant: NISSAN MOTOR CO., LTD., Yokohama (JP)

(72) Inventors: Andrew Batchelor, Kanagawa (JP); Garry Jones, Kanagawa (JP); Yoshinori Sato, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 259 days.

(21) Appl. No.: 16/650,126

(22) PCT Filed: Sep. 25, 2018

(86) PCT No.: PCT/EP2018/075953
§ 371 (c)(1),
(2) Date: Mar. 24, 2020

(87) PCT Pub. No.: WO2019/057987
PCT Pub. Date: Mar. 28, 2019

(65) Prior Publication Data
US 2020/0279129 A1    Sep. 3, 2020

(30) Foreign Application Priority Data
Sep. 25, 2017 (GB) ..................... 1715456

(51) Int. Cl.
*G06K 9/62* (2022.01)
*G05B 13/02* (2006.01)
(Continued)

(52) U.S. Cl.
CPC ........... *G06K 9/627* (2013.01); *G05B 13/027* (2013.01); *G06F 17/13* (2013.01); *G06F 17/17* (2013.01);
(Continued)

(58) Field of Classification Search
CPC .... G06K 9/627; G06K 9/6256; G06K 9/6273; G06K 9/6267; G05B 13/027;
(Continued)

(56) References Cited

U.S. PATENT DOCUMENTS

2019/0279021 A1* 9/2019 Nirenberg ............ G06V 10/449

FOREIGN PATENT DOCUMENTS

EP           0 430 264 A2    6/1991

OTHER PUBLICATIONS

Jonathan Masci et al., Steel Defect Classification with Max-Pooling Convolutional Neural Networks, The 2012 International Joint Conference on Neural Networks (IJCNN), IEEE, Jun. 10, 2012, 6 pages.

* cited by examiner

Primary Examiner — Charlotte M Baker
(74) Attorney, Agent, or Firm — Foley & Lardner LLP (57) ABSTRACT

A machine vision system comprising receiving means configured to receive image data indicative of an object to be classified where there is provided processing means with an initial neural network, the processing means configured to determine a differential equation describing the initial neural network algorithm based on the neural network parameters, and to determine a solution to the differential equation in the form of a series expansion; and to convert the series expansion to a finite series expansion by limiting the number of terms in the series expansion to a finite number; and to determine the output classification in dependence on the finite series expansion.

23 Claims, 5 Drawing Sheets (51) Int. Cl.
*G06F 17/13* (2006.01)
*G06F 17/17* (2006.01)
*G06N 3/04* (2006.01)
*G06N 3/08* (2006.01)
*G06Q 50/04* (2012.01)
*G06Q 10/06* (2012.01)
*G06V 20/52* (2022.01)

(52) U.S. Cl.
CPC ......... *G06K 9/6256* (2013.01); *G06N 3/0445* (2013.01); *G06N 3/0481* (2013.01); *G06N 3/084* (2013.01); *G06Q 50/04* (2013.01); *G06Q 10/06395* (2013.01); *G06V 20/52* (2022.01); *G06V 2201/06* (2022.01)

(58) Field of Classification Search
CPC ....... G06F 17/13; G06F 17/17; G06N 3/0445; G06N 3/0481; G06N 3/084; G06N 3/082; G06N 3/0454; G06N 3/02; G06Q 50/04; G06Q 10/06395; G06V 20/52; G06V 2201/06; G06V 10/454; G06V 10/82; G06V 20/64; G06T 7/0004
USPC ....................................................... 382/157
See application file for complete search history.

MACHINE VISION SYSTEM

TECHNICAL FIELD

The present invention relates to a machine vision system and, more particularly, to a vehicle manufacturing machine vision system. Aspects of the invention relates to a method of reducing computational resources required to implement a machine vision system, and a machine vision control system for configuring a manufacturing process component/system, and in particular a production line arrangement for inspecting a production line component to identify and locate damage, foreign objects and/or incorrectly fitted parts of the production line component.

BACKGROUND

Machine vision systems and methods are used to provide image based automatic inspection and analysis for industrial applications and, in particular, for automatic inspection, quality control processes, and robot control. Specifically, machine vision systems and methods are used to extract Information from an image captured by the system.

Figure 1:
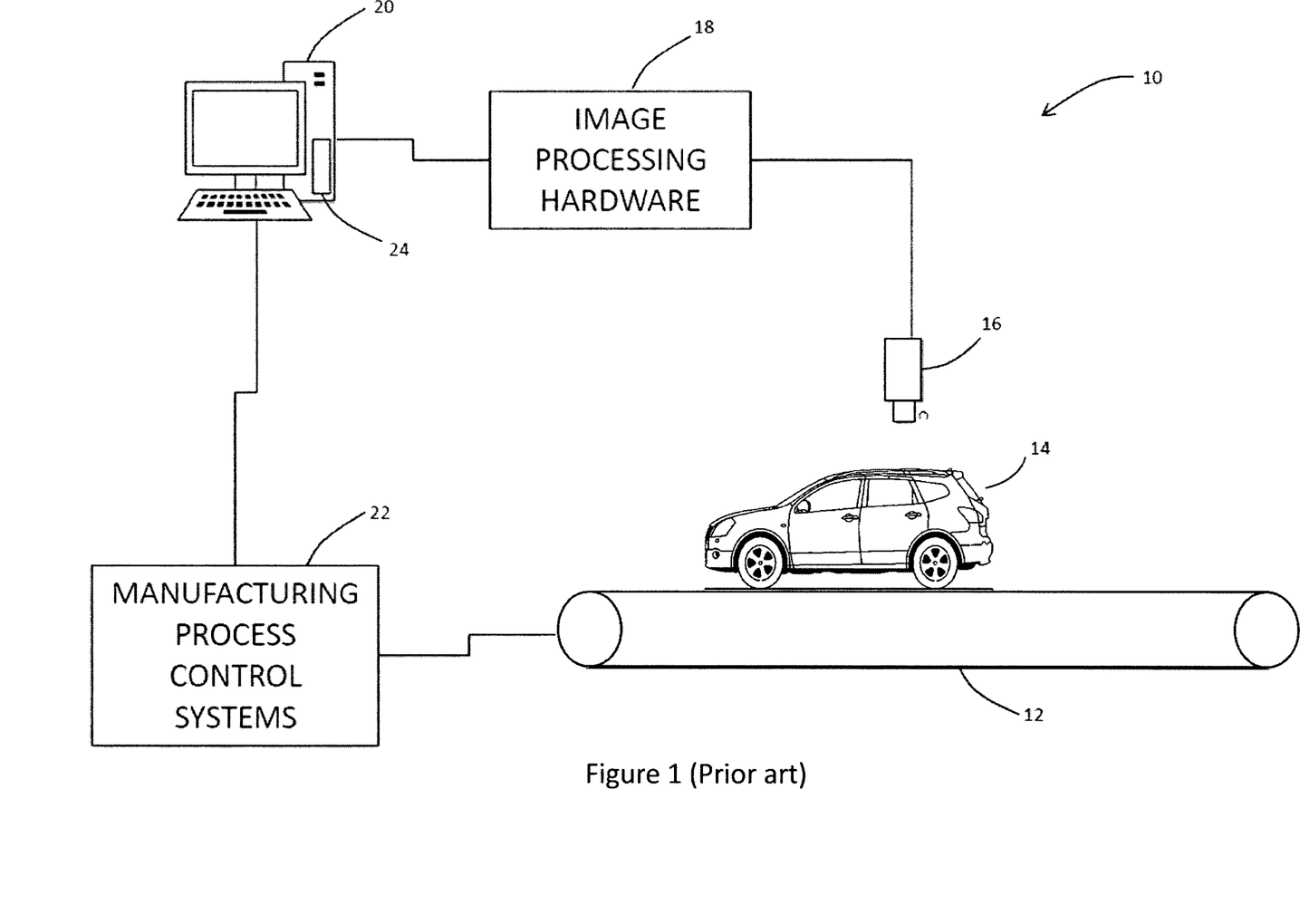
FIG. 1 shows an overview of an arrangement including a prior art machine vision system.

FIG. 1 shows a typical machine vision arrangement 10. The arrangement 10 includes a product line 12 with a product or workpiece 14, e.g. a vehicle, that is to be inspected, and an optical system having one or more optical sensors or cameras 16 connected to an image processing system/hardware 18. The system 10 also includes processing means 20, e.g. a computer, arranged to analyse the captured images so as to make a number of determinations such as detecting defects associated with the product 14. The processing means 20 may then output a signal to a process control system 22 of the arrangement 10, and the control system 22 can configure the product line 12 according to the determination of the processing means 20.

Commonly, such processing means 20 make use of neural network algorithms 24 to identify and classify the captured images. In particular, neural networks can be trained to learn to identify and classify a wide range of items from their captured images by considering test data without needing to be specifically programmed to do so.

Neural networks use a cascade of layers of nonlinear processing units for feature extraction. A neural network can be trained to recognise an object in different situations. A neural network typically has an input layer, a plurality of hidden layers, and an output layer, with each layer comprising a plurality of neurons. The Input layer receives input data, e.g. image data, which is processed through each of the hidden layers, resulting in the neurons of the output layer being assigned a value indicative of the determined classification assigned by the neural network to the input image data. This type of data-driven approach collects a dataset of images, and uses machine learning to train a classifier to classify or label each image into a particular category. The classifier can then be used to evaluate new images, for example images of the workpiece 14 on the production line 12.

Neural networks are particularly suitable for image classification. In some implementations, this may be achieved by directly mapping each pixel of an image sample to a particular neuron in the first layer, such that each neuron shows a 1 or a 0 depending on whether the pixel is on or off.

Depending on the neural network and the problem it is created to solve, each layer of the network may have differing numbers of neurons, and these may or may not be related to particular qualities of the input data. Various neurons in the first layer are connected to neurons in the next layer. In one implementation, namely a so-called fully-connected neural network, each of the neurons in a particular layer is connected to each of the neurons in the next layer.

Each neuron in each layer receives an input value from each of the neurons in the previous layer. These input values are then summed and this sum is compared to a threshold. If the value exceeds the threshold for a particular neuron, that neuron then holds a positive value which can be used as input to neurons in the next layer of neurons, and so on through the various layers of the neural network until it reaches a final layer. At this point, the output of the neural network routine can be read from the values in the final layer.

In one implementation of a neural network used in optical object recognition, each value in the layer is assigned to a particular object or class of object. In such an implementation, the neural network is configured to end with the output layer having, for example, one large positive value in one neuron that indicates which object the network has computed to be the most likely input object. However, these connections can be computationally complex.

One method of implementing neural networks is to treat each level as a matrix of neuron values. Connection strengths can then be implemented as a transformation matrix, which is multiplied by the matrix for each layer. This multiplication allows each value in the previous layer to be scaled according to connection strengths, and then summed, all through matrix multiplication. After the multiplication is performed, a bias matrix is then added to the product matrix to account for the threshold of each neuron in the next level. Then an activation or threshold function, e.g. a hyperbolic tangent function, is applied to each resultant value to determine if the threshold was met, with the resulting values being placed in the matrix for the next layer.

The connections between each layer, and thus an entire neural network, can be represented as a series of matrices. Determining appropriate values for these matrices, then, is the problem of training a neural network. Computation of the neural networks, and training of the neural networks, involves many mathematical computations. Large, complex neural networks need substantial computational resources. For large-scale industrial machine vision systems, the time to train a neural network can be days or weeks even on large, powerful hardware.

Convolutional neural networks (CNN) are a particular category of neural networks particularly suitable for image evaluation and classification. A CNN can include the following layers therein: convolutional layers; pooling layers; and, fully-connected layers.

A convolution layer extracts features from an input image. It has multiple feature maps or filters to identify features in the original image. Each convolutional neuron processes data only for its own receptive field. Known methods, such as tiling, allow manipulation of the input image, e.g. translation, rotation, perspective distortion. The filters can be represented mathematically by matrices, for example.

A pooling layer combines the outputs of neuron clusters in one layer into a single neuron in the next layer. This reduces the dimensionality of each feature map, but retains the most important information.

As mentioned above, a fully-connected layer connects every neuron in one layer to every neuron in another layer. In principle, it is the same as a traditional multi-layer perceptron neural network.

The output from a convolutional or pooling layer represents high-level features of the input image. The purpose of a fully-connected layer is to use these high-level features for classifying the input image into various classes based on a training dataset.

In more detail, when training a CNN the neural network takes a training image as an input. This could be, for example, an image of a wheel with a wheel bolt in the case of the vehicle 14 in FIG. 1. The input image goes through a forward propagation step in the convolution layer, then one or more pooling steps in one or more pooling layers, followed by a forward propagation step in the fully-connected layer. This determines the output probabilities for each class of image it has in its database, e.g. identifying a feature of interest as a certain type of wheel bolt.

As mentioned above, bias inputs to the neural network are also used. These bias inputs to neural nodes are important because they provide every node with a trainable constant value in addition to the normal inputs that the node receives, i.e. they can translate the activation/threshold function by a constant value. This provides the neural network with increased flexibility, but also adds another possible contribution to over-parameterisation of the neural network.

When training the neural network, random weights are assigned to the neurons in the network. The error at the output can be calculated, and then back-propagation techniques are used to calculate errors with respect to all of the weights in the neural network. Recursive steps reduce the errors, so that the network learns to classify a particular image correctly by adjusting the weights of each neuron such that the output error is reduced.

The training step ensures that all of the weights and parameters of the CNN are optimised so that images from the training set are correctly classified. In practice, however, there may be redundant nodes and parameters that do not make a significant contribution to the overall image classification. Such redundant nodes do not contribute to the accuracy of the system, but they still require computation, meaning that the system operates inefficiently, e.g. slower than possible or needing more substantial computing sources than a truly optimised system.

One of the main reasons that CNNs are well suited for machine vision is the availability of computational resources based on graphical processing units (GPUs). GPUs have increased the speed of training times for neural networks that are combined with large databases of millions of images. This is because they are effective at performing parallel processing of the large amounts of data needed to train such systems.

As discussed above, although a neural network may be optimised/trained via techniques such as back propagation techniques, this does not guarantee that the neural network is in a truly optimised form. This can be a problem for implementing the neural network in some situations.

Although training times have decreased, the actual deployment of taught networks is still problematic in industrial and real time field applications where the cost of implementation is critical, such as in industrial plants for mass produced vehicles. In industry, the requirement for very high accuracy and extremely low false positive rates at the lowest cost possible still remains a factor.

For application in industrial processes, the vision systems are required to be free of unnecessary maintenance and calibration combined with the ability to cope with different lighting conditions throughout the day, reflections, obstruction by operators and dirt on the lens of the cameras.

There are a number of different parameters or hyperparameters that must be decided upon when designing a neural network suitable for machine vision based applications. These parameters may include, for example, the number of layers, the number of neurons per layer, etc. Existing schemes that use neural network systems can be over-parameterised for some tasks, and so create long training times and inefficient systems.

Additionally, so-called 'overfitting' can be a problem. A common task in machine learning is to fit a model to a set of training data, with the aim of making reliable predictions on unseen test data. Overfitting occurs when a model is excessively complex, such as having too many parameters relative to the number of observations. A model that has been overfitted has poor predictive performance.

A learning algorithm is typically trained using a set of 'training data', i.e. exemplary situations for which the desired output is known. The aim is that the algorithm will also perform well on predicting the output when fed 'validation data' that was not encountered during its training.

Overfitting is a problem encountered in neural ne irks that, for example, include more adjustable parameters than are ultimately optimal for the task at hand, or by using a more complicated approach than is optimal. It is relatively straightforward to fit a model curve to a dataset however, when a complex model is evaluated on new data, it may perform very poorly. In other words, the calculated model does not generalize well. That is, the error on the training set is driven to a very small value, but when new data is presented to the network the error is large. Expressed differently, the neural network has memorized the training examples well, but it has not learned to generalise to new situations.

When training more complex models needed for machine learning, there must be a balance between overfitting and model complexity. If the model is not complex enough, then it may not be sufficiently powerful to capture all of the useful information necessary to solve the problem at hand, e.g. recognising different components in a number of different orientations and production line scenarios. On the other hand, if the model is very complex, then there is a risk of overfitting, particularly if there is a limited amount of training data available.

Over parametrised, complex, and more general purpose neural networks need relatively large amounts of computational resources and are not suitable to be implemented on relatively 'lightweight' hardware, e.g. mobile or handheld hardware such as laptops, and field-programmable gate array (FPGA) implemented solutions.

Therefore, there is a need for a machine vision system that can be meet the needs of a production line where a complex but flexible model may be required, and which has fast learning and adaptability (re-training) properties.

Current methods for providing such a system include using techniques such as initial over-parametrisation in conjunction with tactics such as early stopping using validation data. However, this mode of training can take a long time and is dependent on the strength of computing resources.

Another technique to improve neural network efficiency is network pruning. This approach ranks the neurons in the network according to their relative contribution to the eventual output classification, and then removes the lowest ranking neurons from the network, resulting in a smaller and faster network. Drawbacks to this approach include poor ranking methods, resulting in an undesirable loss in the level of accuracy of the system. The additional stages of evaluation, pruning, and fine-tuning can also be computationally expensive and difficult to implement.

It is an aim of the present invention to address one or more of the disadvantages associated with the prior art.

SUMMARY OF INVENTION

According to an aspect of the present invention there is provided a machine vision system. The machine vision system may comprise receiving means configured to receive image data indicative of an object to be classified. The machine vision system may comprise processing means provided with an Initial neural network algorithm having an input layer provided with the received image data, at least one hidden layer and an output layer, the at least one hidden layer including a plurality of neurons each having an associated activation function, the processing means being configured to provide an output classification to the output layer in dependence on the received image data. The processing means may be configured to: determine a differential equation describing the initial neural network algorithm based on the activation functions; determine a solution to the differential equation in the form of a series expansion; convert the series expansion to a finite series expansion by limiting the number of terms in the series expansion to a finite number, and, determine the output classification in dependence on the finite series expansion.

The plurality of neurons may also include other associated neural network parameters. The differential equation describing the initial neural network algorithm may also be based on the other associated neural network parameters.

Each connection between two of the neurons may have an associated synaptic weight. Each synaptic weight may have a value that has been adjusted so as to reduce the error between a determined output classification and an associated known classification of an object from a set of training data including image data indicative of an object and an associated known classification of the object. That is, the initial neural network algorithm may be a trained neural network algorithm.

The processing means may be configured to: inspect each of the activation functions to determine whether they are differentiable; and, replace each of the activation functions that are not differentiable with a differentiable approximation to the activation function, the determined differential equation being based on the differentiable activation functions or their approximations thereof.

One or more of the activation functions may be a rectifier function. The processing means may be configured to replace the rectifier function with a sigmoid function.

One or more of the activation functions may be a max pooling layer function. The processing means may be configured to replace the max pooling layer function with a weighted sum of elements.

One or more of the activation functions may be a non-linear activation function. The processing means may be configured to replace the non-linear activation function with a Chen-Fliess series equivalent system.

The processing means may be configured to evaluate the received input data using the finite series expansion to provide the output classification.

The processing means may be configured to transform the finite series expansion into an updated neural network algorithm, and may be configured to evaluate the received input data using the updated neural network to provide the output classification.

The processing means may be configured to determine a state space form of the differential equation so as to determine the series expansion.

The processing means may be configured to extract one or more vector fields from the state space form so as to determine the series expansion.

The processing means may be configured to convert the initial neural network algorithm to a differentiable approximation thereof. The processing means may be configured to determine the differential equation based on the differentiable approximation.

For a fully-connected layer of the initial neural network algorithm the differentiable approximation may of the form:

$$x(k+1)=x(k)+h\sigma(Ax(k)+Bu+b),$$

where x is a latent state, u is a network input, b is a bias, a is a vector of instances of an activation function, h>0, k Is the layer of the initial neural network algorithm, and A and B are state and Input transfer matrices.

For a convolutional layer of the initial neural network algorithm the differentiable approximation may be of the form:

$$X(k+1)=X(k)+h\sigma(C*X+D*U+E),$$

where X is a layer state matrix, U is a layer input matrix, E is a bias, and C and D are state and input convolution filters.

The processing means may be configured to differentiate the differentiable approximation so as to obtain the differential equation.

The processing means may be configured to apply a numerical method to differentiate the differentiable approximation.

The processing means may be configured to determine one or more coefficients of the series expansion using a Chen-Fliess series expansion.

The processing means may be configured to determine a window of convergence of the series expansion.

The processing means is configured to calculate a minimal basis to generate the series expansion.

The processing means may be configured to determine a different set of coefficients of the series expansion for each of a plurality of time windows.

The processing means may be configured to adjust the determined coefficients to adjust vector field parameters of the differential equation until a predetermined level of convergence is achieved.

The processing means may be configured to update the finite series expansion in dependence on the received image data and the associated output classification as part of a re-training process.

The output classification, i.e. the result of the examination of the parts, e.g. vehicle parts, may be sent to a server that is accessible to data visualisation software.

According to an aspect of the present invention there is provided a machine vision system. The machine vision system may comprise receiving means configured to receive training data including image data indicative of an object and an associated known classification of the object. The machine vision system may comprise processing means provided with an initial neural network algorithm having an Input layer provided with the received image data, at least one hidden layer and an output layer, the at least one hidden layer including a plurality of neurons each having an associated activation function, each connection between two of the neurons having an associated synaptic weight, and the processing means being configured to determine appropriate values of the synaptic weights to ensure that evaluating the initial neural network algorithm with the received image data produces the associated known classification. The processing means may be configured to: determine a differential equation describing the initial neural network algorithm based on the activation functions; determine a solution to the differential equation in the form of a series expansion; convert the series expansion to a finite series expansion by limiting the number of terms in the series expansion to a finite number; determine the output classification in dependence on the finite series expansion; and, adjust the values of the synaptic weights so as to reduce the error between the determined output classification and the associated known classification of the object.

The parameters/coefficients/weights of the model may be trained and/or re-trained using any suitable input/output method equated with linear models. The processing means may be configured to apply a gradient descent method so as to train the system. The processing means may be configured to apply a Moore Penrose pseudo inverse method for solving the coefficients of the linear system. This approach may make the system more complex initially by creating more terms. That is, creating the simplified, finite generated series creates more terms. However, this provides the opportunity to simplify the generated series as it is simpler to spot and remove unnecessary terms in the expanded version compared to the more compact original series, therefore improving efficiency over the original series or neural network.

According to an aspect of the present invention there is provided a machine vision control system for configuring a manufacturing process component/system. The machine vision control system may comprise receiving means configured to receive image data indicative of an object to be classified. The machine vision control system may comprise processing means provided with an initial neural network algorithm having an input layer provided with the received image data, at least one hidden layer and an output layer, the at least one hidden layer including a plurality of neurons each having an associated activation function, the processing means being configured to provide an output classification to the output layer in dependence on the received image data. The machine vision control system may comprise control means configured to send a control signal to the manufacturing process component/system in dependence on the output classification so as to configure a setup of the manufacturing process component/system. The processing means may be configured to: determine a differential equation describing the neural network algorithm based on the activation functions; determine a solution to the differential equation in the form of a series expansion; convert the series expansion to a finite series expansion by limiting the number of terms in the series expansion to a finite number; and, determine the output classification in dependence on the finite series expansion.

According to an aspect of the present invention there is provided a production line arrangement for inspecting a production line component to identify and locate damage, foreign objects and/or incorrectly fitted parts of the production line component. The invention particularly relates to an automotive vehicle on a production line. The production line arrangement may comprise an optical system including at least one camera configured to capture one or more sets of image data relating to the production line component. The production line arrangement may comprise a machine vision control system comprising receiving means configured to receive Image data indicative of an object to be classified, and processing means provided with an initial neural network algorithm having an input layer provided with the received image data, at least one hidden layer and an output layer, the at least one hidden layer including a plurality of neurons each having an associated activation function, the processing means being configured to provide an output classification to the output layer in dependence on the received image data. The production line arrangement may comprise a manufacturing process component/system configured to adjust a set up thereof in dependence on the output classification. The processing means may be configured to: determine a differential equation describing the neural network algorithm based on the activation functions; determine a solution to the differential equation in the form of a series expansion; convert the series expansion to a finite series expansion by limiting the number of terms in the series expansion to a finite number; and, determine the output classification in dependence on the finite series expansion.

According to an aspect of the present invention there is provided a machine vision method. The method comprises receiving image data indicative of an object to be classified, and providing an initial neural network algorithm having an input layer provided with the received image data, at least one hidden layer and an output layer, the at least one hidden layer including a plurality of neurons each having an associated activation function. The method comprises determining a differential equation describing the initial neural network algorithm based on the activation functions and other associated neural network parameters, and determining a solution to the differential equation in the form of a series expansion. The method comprises converting the series expansion to a finite series expansion by limiting the number of terms in the series expansion to a finite number, and providing an output classification to the output layer in dependence on the received image data, wherein the output classification is determined in dependence on the finite series expansion.

According to an aspect of the invention there is provided a computer program product storing instructions thereon that when executed by one or more electronic processors causes the one or more processors to perform the method described above.

According to an aspect of the invention there is provided a tablet device comprising the machine vision system described above.

An aspect of the present invention may be expressed as a processing means undertaking the steps of: transforming a non-linear time-dependant model into its bilinear form via a Fliess/Magnus formal power series; generate a minimal basis for the Lie algebra generated from the vector fields of the power series, e.g. Phillip Hall Basis (this generates the minimum number of coefficients required for the model); learn the power series coefficients via stochastic gradient descent or other standard method; from iterated application of the power series to the training set learn the generator vector fields; and, transform the power series back into the required model form.

An aspect of the present invention may be expressed as the steps of: provide a neural network, e.g. a convolutional neural network, for machine vision implementation; convert to bilinear form; train on known data sets; produce an error surface; and, iterate until training is complete.

An aspect of the present invention may be expressed as the steps of: produce an analytic, completely differentiable equation for a neural network assuming that it is completely differentiable (if there is a discontinuous function then replace with an approximation such as a sigmoid function or a hyperbolic tangent function); define known inputs and outputs; convert system to bilinear form via a Fliess system (this is possible via Volterra Kernel method or directly expanded as needed); test the system to determine a window of convergence of the power series (if using a Magnus expansion then this may be calculated a priori); extract the Vector Fields to be used to reset the formal power series at the end of the window of convergence; use the Vector Fields to calculate the power series coefficients at every time window; using standard methods calculate the minimal basis to generate the power series words for example the P Hall basis; train for each time window the coefficients of the formal power series; use the learned coefficients to adjust the vector field parameters; continue until convergence; if the system is to be operated in a set operating environment then adjust the vector fields so that they are no longer global and hence can be described via a look up table methodology; if needed, convert the entire system into fixed point using standard methods; convert the system back into the required form such as a recurrent neural network or differential equation.

An aspect of the invention provides a method of implementing a machine vision system for inspecting an industrial plant process. The method may comprise creating an image database with a plurality of images, e.g. 1000 images. The method may comprise classifying the images in the image database, e.g. highlighting features of interest. The method may comprise training a neural network to identify features of interest. The method may comprise using the trained neural network to manage identification and management of errors. The method may comprise optimising the neural network used for image processing by reducing the number of redundant parameters/hyperparameters. The method may comprise transforming the neural network into a powers series, identifying and removing (potentially) redundant parameters. The power series can then be used in a machine vision system to evaluate and classify images, spot errors, etc.

The power series may be used to construct an optimised version of the original neural network. The method may include a re-training stage where the neural network and/or optimised power series can be re-trained so that the features of interest are changed. The power series may be a power series that can be trained by using only linear algebra techniques.

An aspect of the invention may be expressed as a system and/or method to identify features or actions in physical items, animals, or humans using digital data produced by any form of transducer(s). The system and/or method may use a machine learning algorithm which takes the digital data produced by the transducer and passes it through an algorithm which has previously been taught to recognise and locate unwanted features from it. The algorithm may be produced by taking a convolutional and/or recurrent neural network, and casting it into a form that is completely differentiable. The transducer may be any sensor that converts its input into a digital format that can be understood by a personal computer or Field Programmable Gate Array (FPGA). The method may comprise defining exclusion criteria for assessment, preferably visual assessment by humans, on the digital data input, preferably visual data that has been digitised by a camera, preferably with a resolution of greater than 10 atp. The method may comprise collecting data until at least 10, preferably at least 20, more preferably at least 30 incidences of anomalies, have been collected and stored digitally, preferably on a computer hard disk. The method may comprise inputting human assessment data to the neural network and running the training algorithm. The method may comprise applying the model to digital data for assessment of exclusion. The visual data may be video images of one or more of automotive vehicles, automotive parts, and an automotive plant. The exclusion criteria may be selected from scratches, human waste, etc.

Aspects of the present invention have one or more of the advantages outlined below.

The invention provides for decreasing training times of recurrent neural networks with an associated decrease in the computational power required to deploy them. The invention provides a framework for providing a machine vision neural network algorithm in an FPGA based hard re device. Expressed differently, there Is provided a system that may be trained relatively quickly and which can have 'lightweight' implementation.

Continuous neural networks and recurrent neural networks need large amounts of data, which results in massive amounts of parameters, i.e. weights in the neural network, and non-linear systems are problematic when calculating error functions where local minima can cause problems calculating error gradients, etc. The invention is advantageous in that unnecessary parameters are removed by first identifying linear relationships between parameters then bi-linear relationships. Although this is similar to "dropout" in that weights are removed from the neural network, the decision to remove a weight in the present case is based on whether the algorithm needs it rather than because neural networks are naturally pre-disposed to "overlearning".

A Chen-Fliess system has the ability to train the system using only linear algebra techniques such as gradient descent with any desired regularising technique given the desired input-output images. Gradient descent training is relatively quick and memory-cheap, i.e. fast compared to other methods.

Utilisation of an optimised neural network means that the training of the neural network can be improved. In turn, this means that re-training performance of the neural network can also be improved, making the system faster and more versatile than comparable systems that do not optimise the neural network. This applies to both an optimised/updated neural network and a final, finite (power) series.

The speed of detection of features of interest is increased because there is no need to compute unnecessary terms, i.e. terms that have been removed in the optimisation process.

Reduction of the computational resources needed for detection through use of the optimised neural network means a reduction in size of the hardware needed for identification/detection, e.g. small mobile platforms or FPGAs may be sufficient. In particular, the machine vision system of the present invention may be implemented in a hand-held device, such as a tablet device, or in an embedded camera system. That is, there is no need to use expensive resources.

The invention provides for a neural network that is differentiable from the input to the output and from the output to the input, by replacing any non-continuous functions with continuous functions (approximations). This neural network is then transformed to create a formal power series that can be trained using only liner algebra techniques. This has the advantage of increasing speed and efficiency.

No calibration or accurate positioning of the cameras is needed, meaning that maintenance in case of break down is very much simplified, as personnel are only required to replace a non-functioning piece of equipment. They then position the camera by looking at the display screen until the FOV covers the production line component, e.g. a vehicle.

No special lighting is needed above that which a nominal human operator would require to carry out the inspection.

Together with the lack of any encoders or position sensors to locate the vehicle as this is done via the algorithm described below.

No special requirement to avoid reflections in the vehicles as the invention is trained to recognise reflections in gloss surfaces and mark them as an unintended artefact, effectively removing them from the detection phase.

Creating a neural network that can be trained by using only linear algebra techniques increases the speed and efficiency of the final/updated neural network. This is because linear algebra techniques are highly suitable for manipulating groups of numbers simultaneously, providing structures such as vectors and matrices. Because neural networks store weights, etc. in matrices, providing a neural network format that can use linear algebra makes matrix operations fast and simple. This is especially true for when training on GPUs. GPUs were created with vector and matrix operations in mind, and can manipulate entire matrices of data, e.g. pixels, in parallel.

The present invention addresses slow down and efficiency shortcomings associated with over-parameterised and over-fitted neural networks. The present invention increases efficiency without the drawbacks of other optimisation methods such as neural network pruning.

DETAILED DESCRIPTION

Figure 2:
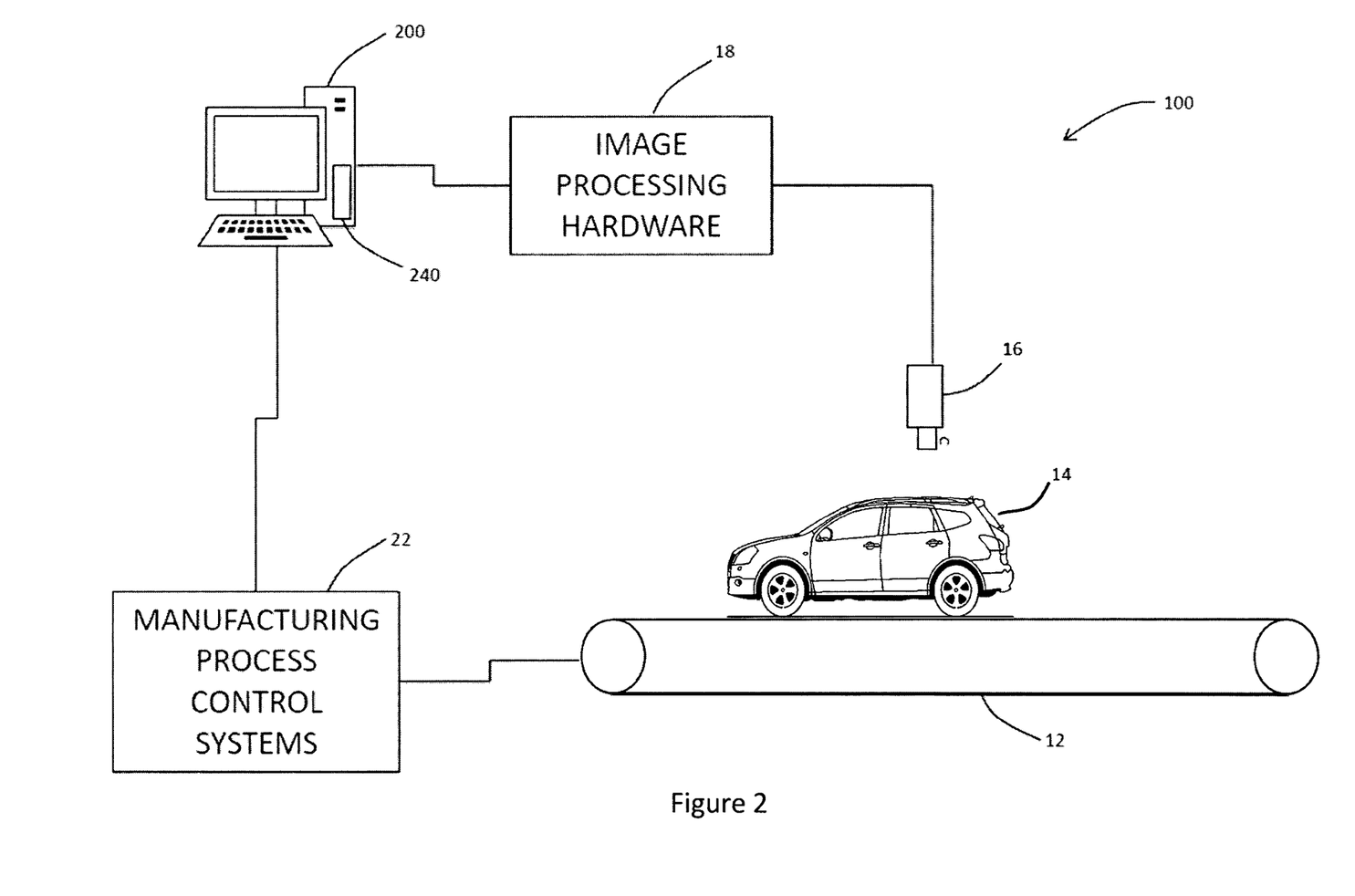
FIG. 2 shows an overview of an arrangement Including a machine vision system according to an embodiment of an aspect of the present invention.

FIG. 2 shows a machine vision arrangement 100 according to an embodiment of the invention. Components which are the same as those shown in the prior art arrangement 10 of FIG. 1 have been labelled with the same reference numerals. The arrangement 100 includes processing means 200 in the form of a computer, the processing means 200 including a machine vision system 240 the operation of which is discussed in detail below.

In the described embodiment, the optical system 16 includes four red, green, blue (RGB) cameras with a resolution of 1080p situated with two cameras either side of the vehicle 14 and with an unobstructed view of the vehicle 14. The cameras are connected to any suitable structure by any suitable means. The cameras are positioned in such a manner that their field of view (FOV) covers the largest possible area of the vehicle 14. The cameras are connected to the computer 200 via four separate CAT7 Ethernet cables and a Gigabit hub, which in turn is connected to the computer 200 via a 10 gigabit network card. The personal computer, hub and cameras are all configured to allow Ethernet Jumbo frames. The cameras are configured to capture images at approximately 10 frames per second at their highest pixel definition. The computer 200 is set up to run an EAL4+ Linux operating system together with suitable software framework to run the algorithm that is described below.

Each individual system is provided with a certificate from a central certificating agency to identify itself with generated via GNU Privacy Guard (GNUPG). The computer 200 has its hard disk set up with full disk encryption using standard Linux Unified Key Setup (LUKS) encryption software. Additionally, the model described below is encrypted with GNUPG and its public encryption key loaded into the server database along with its key revocation certificate. At start up, the processing means 200 connects to the camera 16 and initialises the system. It then attempts to contact a central server via a secure connection using perfect forward encryption, e.g. elliptic curve Diffie-Hellman, and requests a decryption service from the server. The server checks to see if the system is authenticated correctly by checking the Transport Layer Security (TLS) certificate and whether the processing means or system 200 is shown as enabled in the server database. The model is then required to be unencrypted using the vision system's own public GNUPG key. It sends the encrypted model to the server. The model is decrypted by the server which holds the private key for all of the deployed vision systems and then returned into the vision systems random access memory after the secret keys password has been entered by an admin.

During operation, the system sends a heartbeat message to the server every 60 seconds. If the system cannot send the heartbeat outside of a scheduled shutdown event and the logical cryptographic connection link is no longer present the server temporarily revokes the system's encryption key. The server will then send an email to the server administrator informing them of a possible issue. Only the administrator can reinstate the encryption key to allow the system to operate again.

The operation of the processing means 200 and, in particular, the machine vision system 240 will now be described in detail. Unlike the prior art system 24 described above, the system 240 described here does not directly apply a trained neural network to the captured images in the machine vision arrangement in order to classify the images, detect defects, etc. Instead, the system 240 first transforms the trained neural network into an 'optimised' form, and then this optimised form is applied to the captured images so as to make a classification. More specifically, the trained neural network is transformed into an optimised algebraic form. This optimised algebraic form may be used to classify the captured images, or the optimised algebraic form may be transformed back into an optimised or updated neural network form which is then used to classify the captured images.

In summary, therefore, the steps carried out by the system 240 are:

Training a 'standard' neural network that is provided to the system 240;

Transforming the trained neural network Into an optimised algebraic or bilinear form;

Transforming the optimised algebraic form back into an optimised neural network;

Applying either the optimised algebraic form or the optimised neural network form to classify the captured images in the machine vision arrangement 100; and, Re-training the optimised algebraic form or the optimised neural network form based on the classification outputs of the captured images.

Figure 3:
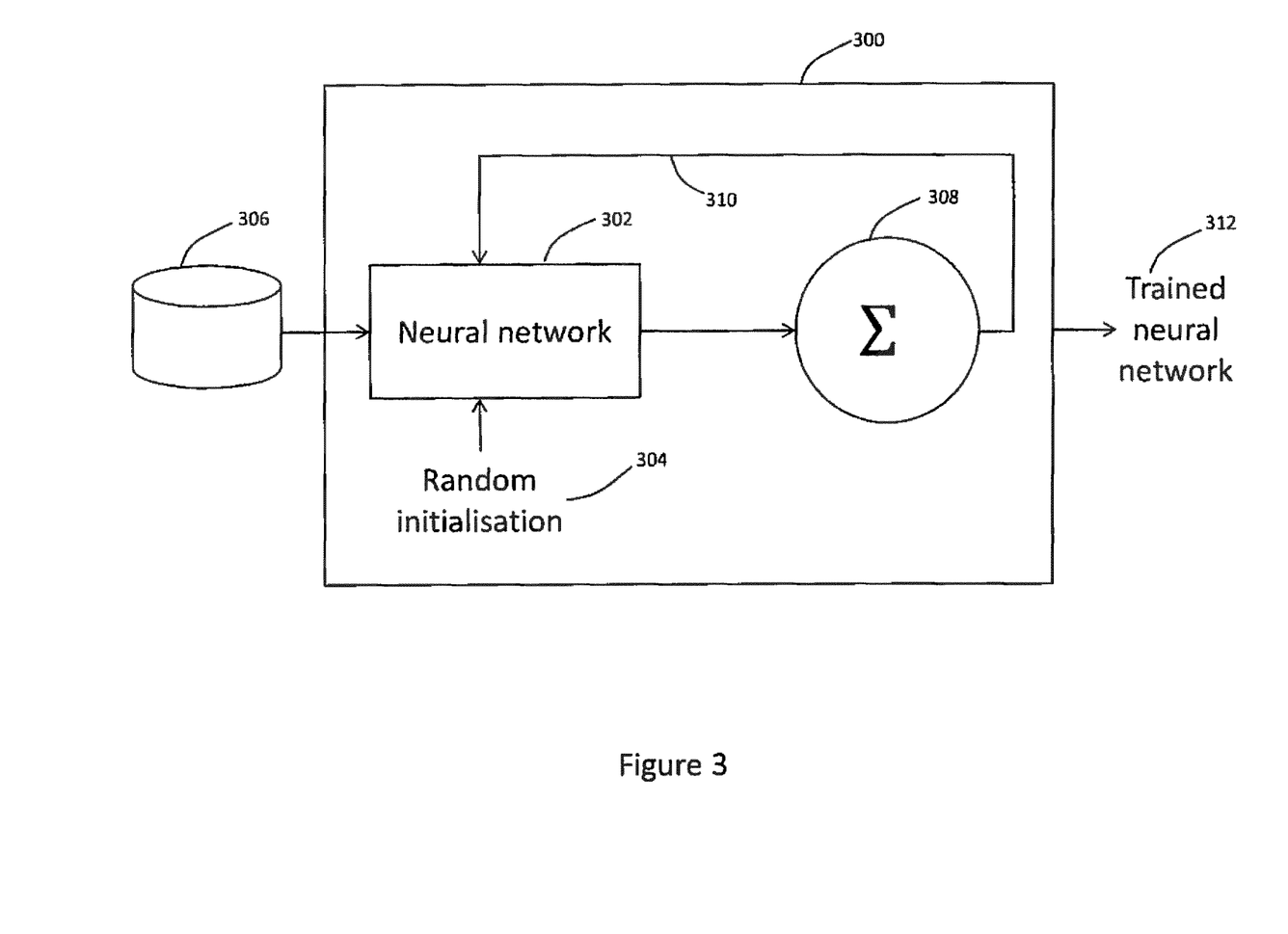
FIG. 3 shows a training module of the machine vision system of FIG. 2 operable during a training phase of the system.

The first step of training the neural network can be performed as follows. Referring to FIG. 3, the system 240 has a neural network training module 300 which is provided with a first, untrained neural network 302. This may be any neural network architecture suitable for a machine vision application, for example a convolutional neural network (CNN), a recurrent neural network, or a combination of one or more of either or both can be used. The neural network may be implemented in any suitable manner, for example using the open-source machine learning software library TensorFlow. The particular choice of neural network is not crucial, and serves only as a means of transferring learned weights and biases to and from the generating series that will be described below.

The neural network 302 is provided with a random initialisation 304, that is, with a set of weights with random, starting values that are to be adjusted during the training process. The neural network 302 is then provided with training data from a database 306 of the processing means 200. The input training data is a set of training images from, for example, a camera, or database of prepared images. The captured image data of the training data has known classifications, i.e. the desired output classification from the neural network 302 is known. This training data is used by the training module 300 to adjust the starting weights of the random initialisation 304 so as to train the neural network to be able to correctly classify the captured images of the training data.

The values assigned by the neural network 302 to each of the output nodes of the network when processing the training data are compared against the known, 'correct' output values of the training data. That is, the contributions to each output node are summed by the summation function 308, and an error term for each of the output nodes is calculated, i.e. by comparing the actual calculated value by the neural network 302 with the 'correct' value from the database 306. This produces an error term for each output node, and the values of the initial weights are then modified based on the error terms. These modified weights 310 are then fed back into the neural network 302, which is then run again. This process is repeated until the calculated error values fall below a threshold value. The training module 300 then outputs the trained neural network 312 that is to be transformed.

Figure 4:
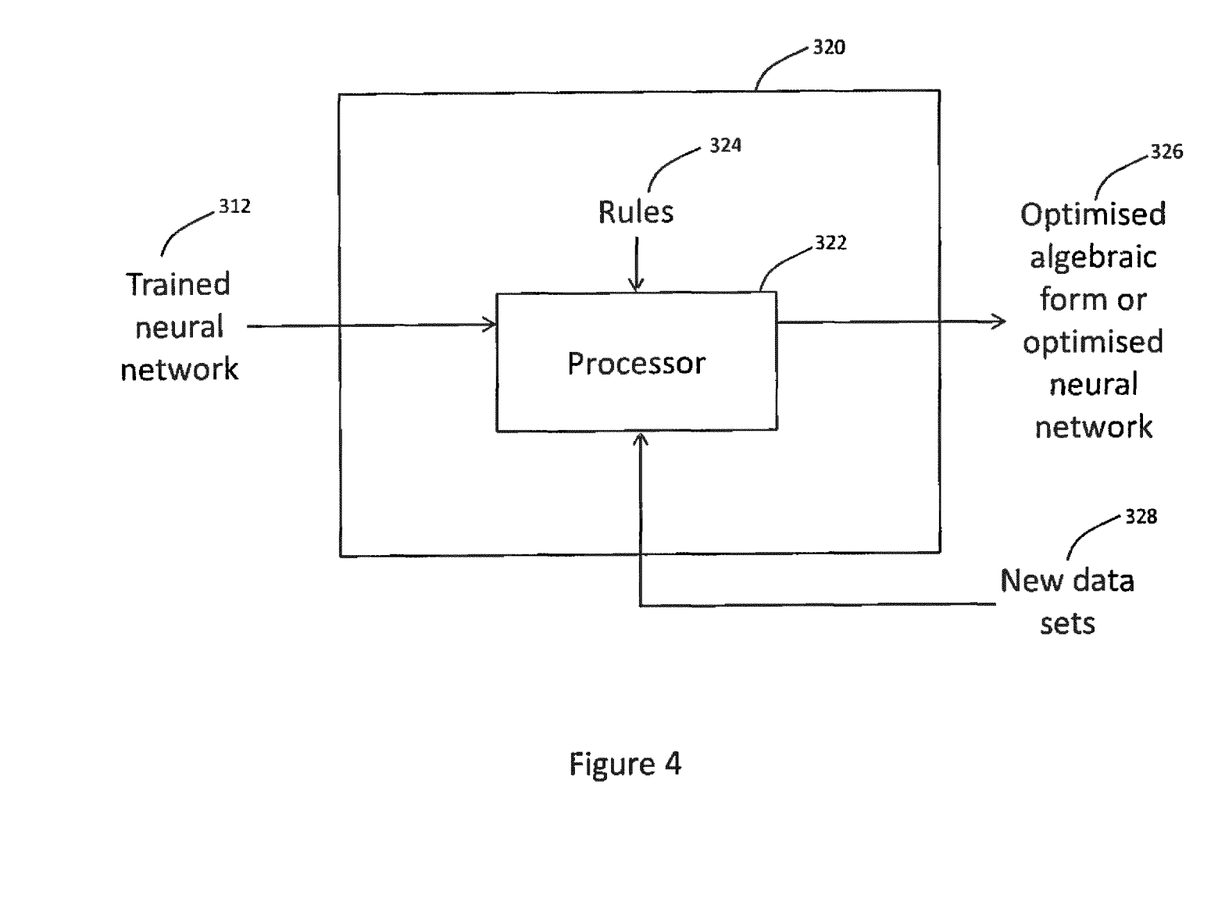
FIG. 4 shows a transformation module of the machine vision system of FIG. 2 operable to transform a neural network into an optimised algebraic form; and, FIG. 5 shows the steps of a method undertaken by the transformation module of FIG. 4.

Referring to FIG. 4, the system 240 includes a transformation module 320 arranged to transform the trained neural network 312 output by the training module 300 into an optimised algebraic form. The transformation module 320 has a processor or processing means 322 configured to receive the trained neural network 312 and a set of rules 324 stored therein, the transformation being conducted according to those stored rules. The transformation module 320 can be any computing resource suitable to carry out the desired operations, i.e. the transformation, on the trained neural network 312. For example, any general purpose computing device, e.g. a desktop or laptop, or specialised hardware, e.g. ASIC/FPGA, may be used.

The processor 322 then outputs a calculated algebraic form 326 of the trained neural network 312. The calculated algebraic form 326 is an algebraic representation of the trained neural network 312 that has optimised parameters for processing the classes of images of the production line/ workpieces 14, e.g. vehicles, to be inspected.

As mentioned above, the resulting algebraic form 326 is an optimised representation of the original neural network that can be used either: 'as is' in the machine vision arrangement 100 to classify captured images from the optical system 16; or, to determine an optimised, trained neural network, wherein the parameters (that is, the weights, biases, number of layers, nodes, etc.) of the original, trained neural network are optimised to increase the speed and efficiency of classification.

In addition, the optimised algebraic form 326 can be fed back into the transformation module 320 to further train or optimise the machine vision system 240 based on new data sets 328, i.e. captured images from the cameras 16 along with their 'correct' classifications.

The operation of the processor 322 to transform the trained neural network 312 into an optimised algebraic form 326 is now described with reference to FIG. 5. Note that the optimised algebraic form 326 is an approximation of the trained neural network 312. The optimised algebraic form 326 is in the form of a power series, e.g. a Taylor series, and can be used to approximate a neural network topology.

Figure 5:
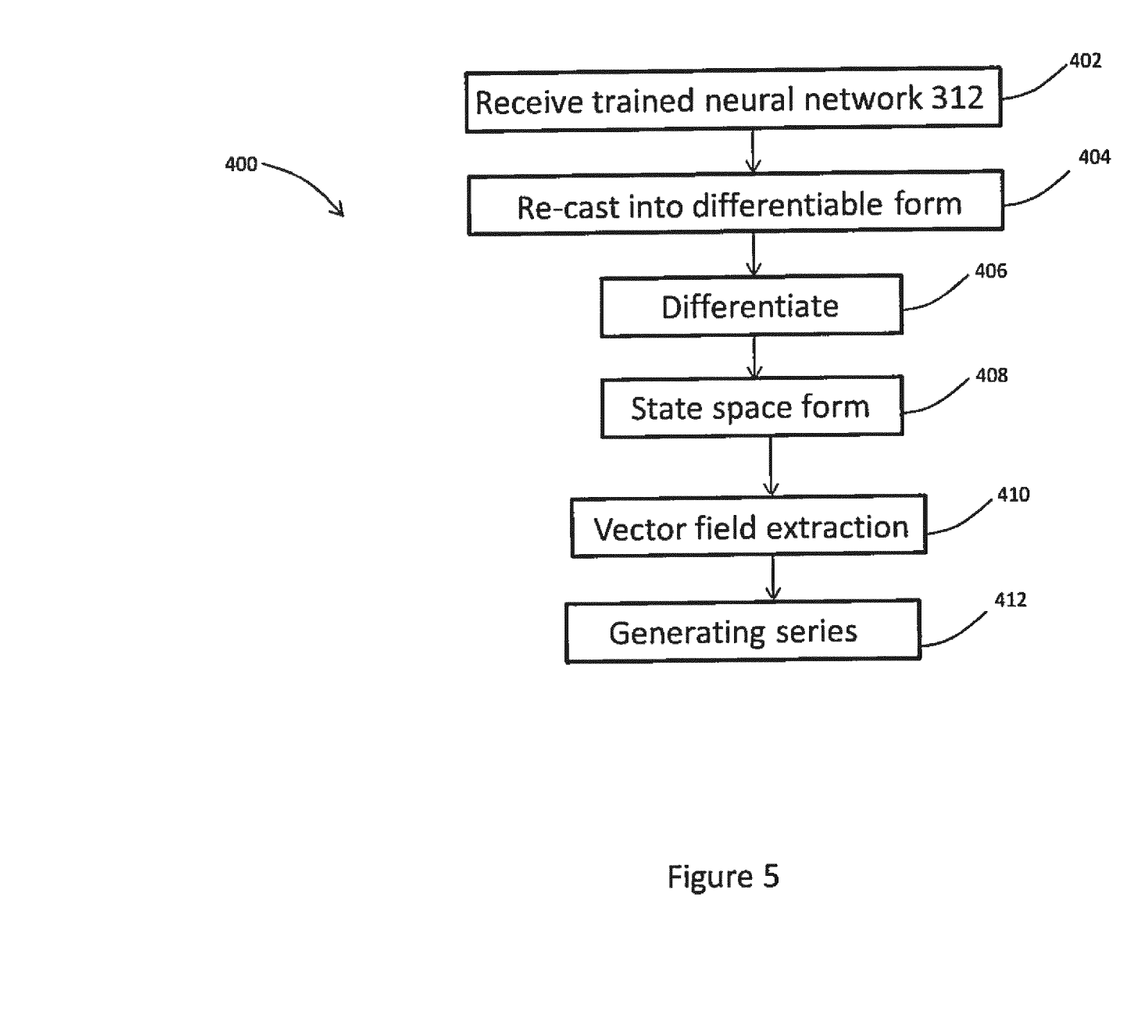

FIG. 5 shows the steps of a method 400 undertaken by the processor 322. At step 402, the processor 322 receives the trained neural network 312 from the training module 300 and the rules 324 for the transformation.

At step 404, the trained neural network is re-cast into a form that is completely differentiable in both a forwards and backwards direction. That is, the neural network is re-cast so that it Is completely differentiable from the input to the output and from the output to the input. Specifically, the activation function at each neuron within the neural network is replaced with a differentiable function.

To re-cast into differentiable form the method removes any static discontinuous function with a continuous approximation.

For example, as previously mentioned, a neural network, in this case a CNN, includes pooling layers which combine the outputs of neuron clusters in one layer into a single neuron in the next layer as one form of activation function. The pooling layers in the trained CNN 312 are replaced in the current embodiment with continuous functions. In particular, max pooling layers, i.e. pooling layers in which the maximum of the input values becomes the value of that particular neuron, are replaced by a weighted sum of elements. Each element in the sum represents an input to the neuron, and one of the elements has a significantly larger weight than each of the other elements so as to re-create the selection of the maximum input value in the max pooling layer.

For example, another type of activation function in the trained CNN 312 is a Rectified Linear Unit (RLU). The rectifier function of the RLU is defined as $$y(u) = \max(0, u),$$

where u is the input to a neuron and y is the output of the neuron. Clearly, this function has a corner at u=0, and so the RLUs are replaced with sigmoid functions which, unlike RLUs, are smooth across their domain. Examples of sigmoid functions are the hyperbolic tangent function, the arctangent function, the logistic function, and the error function. Another possible substitution for the RLU is the tank function.

The result of this stage is a differentiable equation representing the neural network. The next is to differentiate the resulting equation.

The solution to the differentiable equation can be written as a Chen-Fliess series. The minimal solution is used. Finding the minimal solution ensures we return the most compact presentation of the network possible.

This means that the original terms in the neural network such as non-linear activation functions are replaced by their Chen-Fliess series equivalent system.

An example of how a non-linear function can be replaced by the Chen-Flies series is as follows: For a general non-linear activation function defined by y=h(x)u; where y is the output, h(x) is a non-linear state space, u is the input into the function; the Chen-Fliess series is defined as:

$$w_0 = \int_0^t u_0(\tau) d\tau$$

$$w_1 = \int_0^t u_1(\tau) d\tau$$

$$w_{00} = \int_0^t u_0(\tau_1) \int_0^{\tau_1} u_0(\tau_2) d\tau_2 d\tau_1$$

$$w_{11} = \int_0^t u_1(\tau_1) \int_0^{\tau_1} u_1(\tau_2) d\tau_2 d\tau_1$$

To illustrate the process further, differentiable functions such as y(u) obtained at step 404 are differentiated with respect to u by the processor 322 at step 406. As an example, consider the simple case of a neural network with a single input neuron and a single output neuron. The activation function for the single neuron is now replaced by the continuous function $$y(u) = \tanh\left(\sum_0^{n-1} w_i u + b\right)$$

where $w_i$ are the weights associated with each of the inputs to the neuron, u is the input parameter/function, and b is a constant bias value to the activation function. For this example, the sum is $w_0$.

At step 406, y(u) is differentiated with respect to u to obtain $$\dot{y} = \left(\sum_0^{n-1} w_i\right) \text{sech}^2\left(\sum_0^{n-1} w_i u + b\right)$$

where $\dot{y}$ represents the derivative of the network. This is, as a second order differential equation, practically speaking, difficult to solve. Therefore the method involves transforming the equation into a state space format using standard mathematical methods to obtain single order differential equations that are simpler and faster to solve.

If the bias is set to zero, i.e. b=0, then at step 408 the above may be converted to the state space form $$\dot{x}_1 = k_1 \text{sech}^2(x_2)$$

$$\dot{x}_2 = w\dot{u}$$

The parameters $x_1$, $x_2$, $k_1$, w are states in parameter space, or can be alternatively be understood as coordinates in state space. For example, $x_1$ may represent the output of a neuron, and $x_2$ the weighted sum of the input. Differentiation can be applied with respect to, e.g., time.

This step is merely to transform the network into a form in which we can apply the above method of changing it into Chen-Fliess.

The method now provides a state space form.

From this state space form, the vector fields can be extracted at step 410 to obtain $$A_0 = k_1 \text{sech}^2(x_2)$$

$$A_1 = k_1$$

This allows the processor 322 to obtain the resulting generating series, g, at step 412, where $$g = c_0 \int_0^t d\tau + c_1 \int_0^t \dot{u} d\tau$$

where $c_0$ and $c_1$ are generated from application of the vector fields.

This may be simplified to obtain $$g = c_0 t + c_1 u$$

When the generating series is truncated with word length 1 it is a linearisation of the underlying activation function that is valued for a small time interval and small changes in input. To make the generating series valid for all time and inputs the coefficients $c_0$ and $c_1$ need to be recalculated at regular intervals of time using the same procedure as described above. As the length of the series is increased then the region of convergence is also increased. This means that the length of time and the amount the input can change is increased before the coefficients of the series need recalculating. The series can be truncated at any length.

To implement the generating series in the processor 322 it is required to convert the equations described above from continuous time to finite time. This is achieved via replacing the Chen Fliess operators described above with iterated sums such that the required error is achieved under the circumstance the algorithm is operating. The integrals of the generating series are replaced with sums using well known mathematical methods.

More generally, the steps of the method undertaken by the processor 322 may be described as follows. The trained neural network 312 is received by the processor 322 at step 402, and each (hidden) layer of the network 312 is defined as being either a fully-connected layer or a convolutional layer.

For each fully-connected layer of the network 312, at step 402 the layer is re-cast into differentiable form, specifically into the following form:

$$x(k+1) = x(k) + h\sigma(Ax(k) + Bu + b),$$

where x is the latent state, u is the network input, b is the bias, a is a vector of instances of an activation function, h>0, and A and B are the state and input transfer matrices. This means that to determine a vector representation at layer k+1 in the network (or at time k+1 for a recurrent network), the vector representation of the previous layer (or previous time-step) x(k) is additively updated with some non-linear transformation.

Similarly, for each convolutional layer of the network 312, at step 402 the layer is re-cast into differentiable form, specifically into the following form:

$$X(k+1) = X(k) + h\sigma(C*X + D*U + E),$$

where X is the layer state matrix, U is the layer input matrix, E is the bias, and C and D are the state and input convolution filters. That is, the matrix multiplications used for the fully-connected layers are instead replaced with convolution operators.

At step 406, the above dynamical systems representing each layer are differentiated so as to convert them into differential equations. In particular, a numerical method may be implemented to perform this step. In the described embodiment, a Runge-Kutta method is used; however, the type of numerical integration will depend on a sampling rate of the system. For example, in some embodiments a form of Simpson's rule may be used.

This results in a series of non-linear, non-autonomous first-order ordinary differential equations (ODEs), one for each layer of the neural network. The output of the differential equation for a particular layer of the neural network is the input to the differential equation of the next layer of the neural network. This may be regarded as a single ODE representing the entire neural network, where each layer of the network is a state of the ODE. Specifically, the first or top layer of the network is the input to the ODE, and the last or bottom layer of the network is the output of the ODE, where the other layers are latent (hidden).

The inputs to the network may be considered to be coordinates in space, e.g. x, y coordinates. Depending on the number of inputs needed, in particular if there are a relatively large number of inputs, then this can be transformed into smaller subsets of inputs that vary with time. Specifically, a function is obtained which traces over all inputs with varying time. In general, an image will provide m×n inputs; however, for example, a small 3×3 matrix may instead be traced across the entire image, i.e. over all of the m×n inputs, with a predetermined route and velocity so that at any given time the particular point of the image which is providing the inputs is known. This helps to reduce the number of terms when calculating the generating series coefficients at step 412 as described above using Chen-Fliess series.

Prior to this, the free flow and driven vector fields of the ODE describing the network are defined and then separated. The vector fields may be regarded as a function which gives the direction and magnitude of the change in the output of the ODE driven by changes in time and/or input. From an initial condition the direction and value of the vector field will not change for a small region around it. If the flow of the equation is then moved for a small amount of time then the vector field may be used to determine the change in direction and magnitude of the input that is needed to satisfy the equation. The value of the vector field is then recalculated and the equation is allowed to move for another small amount of time. This process is repeated several times to obtain a method of solving the original equation for any input and all time.

Finally, once the vector fields have been defined, the generating series coefficients are calculated at step 412 as described above.

Note that, although the conversion to state-space form is shown in FIG. 5 as taking place after the conversion to differentiable form and subsequent differentiation, it will be understood that the conversion to state-space form can also take place prior to this, provided that any operation is linear.

The processor 322 then outputs the calculated generating series or 'optimised algebraic form' 326 to be used on validation or real-time data in the machine vision arrangement 100, that is, to be used to classify newly-received image data. In particular, the machine vision system 240 receives image data from the optical system 16 and classifies the input data into a particular output classification using the generated 'optimised' parameters of the generating series. This output can then be sent to the manufacturing process control systems 22.

Alternatively, the calculated generating series is transformed back into a neural network, this time an 'optimised' neural network 326, by the processor 322 before being output by the transformation module 320. Then the optimised neural network 326 is used to classify newly-received image data in the machine vision arrangement 100.

Once the optimised neural network 326 has classified the newly-received data, then the result of this classification can be fed back into the training module 300 to further refine the optimised parameters, and therefore further improve the performance of the arrangement.

Many modifications may be made to the above-described embodiment Without departing from the scope of the invention as defined in the accompanying claims.

In the described embodiment, the 'standard' neural network provided to the system 240 is first trained by the system 240 (perhaps in a conventional manner) before being transformed into an optimised form; however, in different embodiments the neural network need not be trained before being transformed into an optimal form. For example, if the desired neural network is based on a model or neural network which has already been trained successfully, and it is desired to implement this model in a more efficient manner, then this would be the neural network to start with. However, if no model is preferred, i.e. no neural network has already been trained, then the generating series expansion may be used directly, eliminating the need to define a particular model, i.e. without needing to train the initial neural network.

In the described embodiment, the transformation module 320 is part of the same system 240 as the training module 300 that trains the initial, standard neural network; however, in different embodiments the transformation module 320 may run on a separate computing system to that of the training module 300.

This application claims the benefit of priority from United Kingdom Patent application No. 1715456.8 filed on Sep. 25, 2017, the entire contents of which are incorporated by reference in the description of the present application.

The invention claimed is:

1. A machine vision system, comprising:
a receiver configured to receive image data indicative of an object to be classified; and,
a processor provided with an initial neural network algorithm having an input layer provided with the received image data, at least one hidden layer and an output layer, the at least one hidden layer including a plurality of neurons each having an associated activation function, the processor being configured to provide an output classification to the output layer in dependence on the received image data,
memory in electronic communication with the processor;
instructions stored in the memory, the instructions being executable to implement a method comprising:
determining a single ordinary differential equation representing the entirety of a neural network describing the initial neural network algorithm based on the activation functions of the plurality of neurons, wherein in the single ordinary differential equation an output of a differential equation for a particular layer of the neural network is an input to a differential equation of a next layer of the neural network;
determining a solution to the single ordinary differential equation in the form of a series expansion;
converting the series expansion to a finite series expansion by limiting the number of terms in the series expansion to a finite number; and,
determining the output classification in dependence on the finite series expansion.

2. A machine vision system according to claim 1, wherein the instructions are executable to implement a method comprising:
inspecting each of the activation functions to determine whether the activation functions are differentiable; and,
replacing each of the activation functions that are not differentiable with a differentiable approximation to the activation function,
the determined differential equation being based on the differentiable activation functions or their approximations thereof.

3. A machine vision system according to claim 2, wherein one or more of the activation functions is a rectifier function, and wherein the instructions are executable to implement a method comprising: replacing the rectifier function with a sigmoid function.

4. A machine vision system according to claim 2, wherein one or more of the activation functions is a max pooling layer function, and wherein the instructions are executable to implement a method comprising: replacing the max pooling layer function with a weighted sum of elements.

5. A machine vision system according to claim 1, wherein the instructions are executable to implement a method comprising: evaluating the received input data using the finite series expansion to provide the output classification.

6. A machine vision system according to claim 1, wherein the instructions are executable to implement a method comprising: transforming the finite series expansion into an updated neural network algorithm, and evaluating the received input data using the updated neural network to provide the output classification.

7. A machine vision system according to claim 1, wherein the instructions are executable to implement a method comprising: determining a state space form of the differential equation so as to determine the series expansion.

8. A machine vision system according to claim 7, wherein the instructions are executable to implement a method comprising: extracting one or more vector fields from the state space form so as to determine the series expansion.

9. A machine vision system according to claim 1, wherein the instructions are executable to implement a method comprising: converting the initial neural network algorithm to a differentiable approximation thereof, and determining the differential equation based on the differentiable approximation.

10. A machine vision system according to claim 9, wherein for a fully-connected layer of the initial neural network algorithm the differentiable approximation is of the form:

$$x(k+1)=x(k)+h\sigma(Ax(k)+Bu+b)$$

where x is a latent state, u is a network input, b is a bias, σ is a vector of instances of an activation function, h>0, k is a layer of the initial neural network algorithm, and A and B are state and input transfer matrices.

11. A machine vision system according to claim 9, wherein for a convolutional layer of the initial neural network algorithm the differentiable approximation is of the form:

$$X(k+1)=X(k)+h\sigma(C*X+D*U+E)$$

where X is a layer state matrix, U is a layer input matrix, E is a bias, C and D are state and input convolution filters, σ is a vector of instances of an activation function, h>0, and k is a layer of the initial neural network algorithm.

12. A machine vision system according to claim 9, wherein the instructions are executable to implement a method comprising: differentiating the differentiable approximation so as to obtain the differential equation.

13. A machine vision system according to claim 12, wherein the instructions are executable to implement a method comprising: applying a numerical method to differentiate the differentiable approximation.

14. A machine vision system according to claim 1, wherein the instructions are executable to implement a method comprising: determining a window of convergence of the series expansion.

15. A machine vision system according to claim 1, wherein the instructions are executable to implement a method comprising: calculating a minimal basis to generate the series expansion.

16. A machine vision system according to claim 1, wherein the instructions are executable to implement a method comprising: determining a different set of coefficients of the series expansion for each of a plurality of time windows.

17. A machine vision system according to claim 16, wherein the instructions are executable to implement a method comprising: adjusting the determined coefficients to adjust vector field parameters of the differential equation until a predetermined level of convergence is achieved.

18. A machine vision system according to claim 1, wherein the instructions are executable to implement a method comprising: updating the finite series expansion in dependence on the received image data and the associated output classification as part of a re-training process.

19. A tablet device comprising the machine vision system of claim 1.

20. A machine vision system, comprising:
a receiver configured to receive training data including image data indicative of an object and an associated known classification of the object; and,
a processor provided with an initial neural network algorithm having an input layer provided with the received image data, at least one hidden layer and an output layer, the at least one hidden layer including a plurality of neurons each having an associated activation function, each connection between two of the neurons having an associated synaptic weight, and the processor being configured to determine appropriate values of the synaptic weights to ensure that evaluating the initial neural network algorithm with the received image data produces the associated known classification,
memory in electronic communication with the processor;
instructions stored in the memory, the instructions being executable to implement a method comprising:
determining a single ordinary differential equation representing the entirety of a neural network describing the initial neural network algorithm based on the activation functions of the plurality of neurons, wherein in the single ordinary differential equation an output of a differential equation for a particular layer of the neural network is an input to a differential equation of a next layer of the neural network;
determining a solution to the single ordinary differential equation in the form of a series expansion;
converting the series expansion to a finite series expansion by limiting the number of terms in the series expansion to a finite number;
determining an output classification in dependence on the finite series expansion; and,
adjusting the values of the synaptic weights so as to reduce error between the determined output classification and the associated known classification of the object.

21. A machine vision control system for configuring a manufacturing process component/system, the machine vision control system comprising:
a camera configured to receive image data indicative of an object to be classified; and,
a processor provided with an initial neural network algorithm having an input layer provided with the received image data, at least one hidden layer and an output layer, the at least one hidden layer including a plurality of neurons each having an associated activation function, the processor being configured to provide an output classification to the output layer in dependence on the received image data; and, a controller configured to send a control signal to the manufacturing process component/system in dependence on the output classification so as to configure a setup of the manufacturing process component/system, memory in electronic communication with the processor;

instructions stored in the memory, the instructions being executable to implement a method comprising:

determining a single ordinary differential equation representing the entirety of a neural network describing the initial neural network algorithm based on the activation functions of the plurality of neurons, wherein in the single ordinary differential equation an output of a differential equation for a particular layer of the neural network is an input to a differential equation of a next layer of the neural network;

determining a solution to the single ordinary differential equation in the form of a series expansion;

converting the series expansion to a finite series expansion by limiting the number of terms in the series expansion to a finite number; and, determining the output classification in dependence on the finite series expansion.

22. A production line arrangement for inspecting a production line component to identify and locate damage, foreign objects or incorrectly fitted parts of the production line component, the production line arrangement comprising:

an optical system including at least one camera configured to capture one or more sets of image data relating to the production line component;

a machine vision control system comprising a receiver configured to receive image data indicative of an object to be classified, and a processor provided with an initial neural network algorithm having an input layer provided with the received image data, at least one hidden layer and an output layer, the at least one hidden layer including a plurality of neurons each having an associated activation function, the processor being configured to provide an output classification to the output layer in dependence on the received image data;

memory in electronic communication with the processor;

instructions stored in the memory; and, a manufacturing process component/system configured to adjust a set up thereof in dependence on the output classification, the instructions being executable to implement a method comprising:

determining a single ordinary differential equation representing the entirety of a neural network describing the initial neural network algorithm based on the activation functions of the plurality of neurons, wherein in the single ordinary differential equation an output of a differential equation for a particular layer of the neural network is an input to a differential equation of a next layer of the neural network;

determining a solution to the single ordinary differential equation in the form of a series expansion;

converting the series expansion to a finite series expansion by limiting the number of terms in the series expansion to a finite number; and, determining the output classification in dependence on the finite series expansion.

23. A machine vision method, comprising:

receiving image data indicative of an object to be classified;

providing an initial neural network algorithm having an input layer provided with the received image data, at least one hidden layer and an output layer, the at least one hidden layer including a plurality of neurons each having an associated activation function;

determining a single ordinary differential equation representing the entirety of a neural network describing the initial neural network algorithm based on the activation functions of the plurality of neurons and other associated neural network parameters, wherein in the single ordinary differential equation an output of a differential equation for a particular layer of the neural network is an input to a differential equation of a next layer of the neural network;

determining a solution to the single ordinary differential equation in the form of a series expansion;

converting the series expansion to a finite series expansion by limiting the number of terms in the series expansion to a finite number; and, providing an output classification to the output layer in dependence on the received image data, wherein the output classification is determined in dependence on the finite series expansion.

* * * * *